(12) United States Patent
Nodop et al.

(10) Patent No.: US 8,948,219 B2
(45) Date of Patent: Feb. 3, 2015

(54) LASER SYSTEM WITH NONLINEAR COMPRESSION

(75) Inventors: Dirk Nodop, Jena (DE); Alexander Steinmetz, Jena (DE); Jens Limpert, Jena (DE); Andreas Tuennermann, Weimar (DE)

(73) Assignees: Fraunhofer-Gesellschaft zur Foerderung der Angewandten Forschung E.V., Munich (DE); Friedrich-Schiller-Universitaet Jena, Jena (DE)

( * ) Notice: Subject to any disclaimer, the term of this patent is extended or adjusted under 35 U.S.C. 154(b) by 0 days.

(21) Appl. No.: 13/640,803

(22) PCT Filed: Apr. 13, 2011

(86) PCT No.: PCT/EP2011/001859
§ 371 (c)(1),
(2), (4) Date: Dec. 6, 2012

(87) PCT Pub. No.: WO2011/128087
PCT Pub. Date: Oct. 20, 2011

(65) Prior Publication Data
US 2013/0083814 A1 Apr. 4, 2013

(30) Foreign Application Priority Data

Apr. 14, 2010 (DE) .......................... 10 2010 014 998
May 21, 2010 (DE) .......................... 10 2010 021 262

(51) Int. Cl.
| | |
|---|---|
| H01S 3/11 | (2006.01) |
| H01S 3/00 | (2006.01) |
| G02F 1/35 | (2006.01) |
| H01S 3/067 | (2006.01) |
| H01S 3/113 | (2006.01) |
| H01S 3/16 | (2006.01) |

(52) U.S. Cl.
CPC ................. *H01S 3/11* (2013.01); *H01S 3/0057* (2013.01); *G02F 1/353* (2013.01); *H01S 3/0092* (2013.01); *H01S 3/06754* (2013.01); *H01S 3/113* (2013.01); *H01S 3/1618* (2013.01)
USPC .......................................................... 372/10

(58) Field of Classification Search
CPC ..... G02F 1/353; H01S 3/0057; H01S 3/0092; H01S 3/06754; H01S 3/113; H01S 3/1618; H01S 3/11
USPC .......................................................... 372/10
See application file for complete search history.

(56) References Cited

U.S. PATENT DOCUMENTS 8,310,749 B2    11/2012   Mottay et al.
2010/0309545 A1  12/2010   Zaouter et al.

FOREIGN PATENT DOCUMENTS

| FR | 2 917 544 | 12/2008 | |
|---|---|---|---|
| FR | 2917544 | * 12/2008 | .............. H01S 3/067 |
| FR | 2 926 406 | 7/2009 | |
| FR | 2926406 | * 7/2009 | .............. H01S 3/067 |
| WO | WO 2006/113507 | 10/2006 | |

OTHER PUBLICATIONS

International Search Report of PCT/EP2011/001859, date of mailing Nov. 28, 2011.

* cited by examiner

*Primary Examiner* — Tuan Nguyen
(74) *Attorney, Agent, or Firm* — Collard & Roe, P.C.

(57) ABSTRACT

The invention relates to a laser system with a passively Q-switched laser 1, a spectrally widening element 3, and a compression element 4. Laser systems of this kind are utilized for generating ultra-short laser pulses. Systems, mode-coupled solid-state lasers known from prior art allow for generating laser pulses in the sub-10 ps range only with complicated and alignment-sensitive free-beam arrangements. Therefore, it is the object of the present invention to create a laser system that generates pulse durations of less than 10 ps and which is simple and compact to produce at the same time. In order to achieve this object, the present invention proposes that the passively Q-switched laser 1 is provided with a longitudinally monomode output radiation which is spectrally widened by means of the spectrally widening element 3 by self-phase modulation and is temporally compressed by the compression element 4.

11 Claims, 2 Drawing Sheets

LASER SYSTEM WITH NONLINEAR COMPRESSION

CROSS REFERENCE TO RELATED APPLICATIONS

This application is the National Stage of PCT/EP2011/001859 filed on Apr. 13, 2011 which claims priority under 35 U.S.C. §119 of German Application Nos. 10 2010 014 998.5 filed on Apr. 14, 2010, and 10 2010 021 262.8 filed on May 21, 2010, the disclosures of which are incorporated by reference. The international application under PCT article 21(2) was not published in English.

BACKGROUND OF THE INVENTION

1. Field of the Invention

The invention relates to a laser system with a passively Q-switched laser, a spectrally widening element, and a compression element.

2. Description of the Related Art

Laser systems of this kind are intended to be utilized for generating ultra-short laser pulses. In prior art, only complicated mode-coupled laser systems are hitherto known which may achieve a pulse duration of under 10 ps. Hence a simple and compact solution to generate laser pulses in the sub-10 ps range offers a substantial market potential. A field of application, among others, is the highly-precise micro-material processing because a heat input in the material which is reduced by a short pulse duration offers quality advantage, e.g. more precise edges in laser cutting. Mode-coupled solid-state lasers known from prior art are hitherto used as typical sources for ps pulses. Apart from the active medium, they are comprised of a nonlinear switch, e.g. a saturable semiconductor mirror, and elements for dispersion compensation. These complex and alignment-sensitive free-beam structures furnish pulse sequence frequencies in a range from 10 MHz to greater than 100 MHz. However, purposive pulse sequence frequencies for most applications are those under 10 MHz, typically some 100 kHz. Therefore, with prior art mode-coupled solid-state lasers it is necessary to implement additional elements which reduce the pulse sequence frequency. Customary elements are so-called resonator-extending mirror arrangements which however increase the complexity of the structures still further and thus make these sensitive to alignments. Alternatively, a pulse picker (e.g. a Pockel cell) is implemented upstream to the amplifier stages which reduces the pulse sequence frequency into the range required for the application. On the whole, mode-coupled laser systems are always sensitive free-beam structures whereby they are only conditionally suitable for commercial use.

The passively Q-switched lasers according to the generic term of the present invention are simply built-up compact microchip lasers comprised of a monolithic compound structure consisting of a saturable absorber, a laser crystal, and a resonator mirror and are pumped with a laser diode through simple optics. In this manner, pulses with pulse sequence frequencies of several 10 kHz up to some MHz with pulse durations ranging between 50 ps and 200 ps can be generated. A pulse duration smaller than 10 ps with these passively Q-switched lasers has not yet been possible hitherto.

SUMMARY OF THE INVENTION

Now, therefore, it is the object of the present invention to create a laser system which generates pulse durations of less than 10 ps and which is simple and compact to produce at the same time.

In order to achieve this object, the present invention proposes that the passively Q-switched laser is provided with a longitudinally monomode output radiation which is spectrally widened by means of the spectrally widening element by self-phase modulation and is temporally compressed by the compression element. By means of self-phase modulation (SPM), the spectral width of short laser pulses can be so enhanced that by a subsequent compensation of the phase terms a substantially shortened pulse duration is achieved. What is important here is the longitudinally monomode emission of the Q-switched laser, i.e. the emission of a single, well defined longitudinal mode. If several longitudinal modes with a statistical phase relationship contributed to the emission, a subsequent compression of spectral portions newly generated by self-phase modulation would not be possible and/or severely subsurface-afflicted. The subsequent compression of pulses is accomplished by means of a dispersive element which causes the pulse shortening.

An advantageous version of a passively Q-switched laser is a passively Q-switched microchip laser. Due to their monolithic structure, microchip lasers can be manufactured in an extremely compact manner and thus they can be integrated into a laser system in an uncomplicated way.

Especially suitable for use as microchip laser is a compound structure comprised of a neodymium-endowed vanadate crystal and a saturable semiconductor mirror. These lasers provide a longitudinally monomode radiation of a high quality.

Advantageously, the passively Q-switched laser has a pulse duration which is less than 1 ns, less than 200 ps or less than 50 ps. A passively Q-switched laser of this pulse duration provides a best suitable output radiation in order to subsequently achieve a pulse duration of less than 10 ps by means of the inventive spectral widening and temporal compression.

It is proposed that the spectrally widening element is an optical single-mode fiber. In a single-mode fiber, a self-phase modulation usually occurs during the propagation of pulses due to its small fiber diameter which results in a—for most applications—non-desired spectral widening of the conducted radiation. This nonlinear effect of the single-mode fiber, however, can also be utilized in the sense of the present invention in a well-aimed manner for the spectral widening. Alternatively, such an effect can also be achieved with a suitable waveguide structure.

Advantageously the laser system is comprised of at least one optical amplifier. Amplification of the laser pulse can be provided upstream or even downstream of the spectrally widening element. Amplification is feasible by a single optical amplifier or by several amplifier stages. Likewise, at least one optical amplifier can simultaneously act as a spectrally widening element. Conceivable in this sense is an optical amplifier fiber which assumes the task of both amplification and spectral widening by self-phase modulation.

It is furthermore provided for that the compression element is a Bragg grating. For example, the Bragg grating can be a chirped fiber-optical Bragg grating (FBG) or also a chirped volume-optical Bragg grating (VBG). Likewise, the compression element can also be a transmitting or a reflecting grating pair or a prism structure. Hence, even conventional compression elements can be utilized.

Furthermore advantageous are optional elements which alter the laser pulse in terms of its properties—for example pulse duration, pulse distance, frequency, contrast, spectral composition—in such a manner that the characteristic data and/or the quality of the output radiation of the inventive laser system are improved. For this purpose, the laser system may be comprised of a pulse extender by means of which the spectrally widened radiation is extended in time. Furthermore, the laser system may be comprised of an element which divides the laser pulse in terms of time, or even a frequency-converting element, an element improving the pulse contrast or a spectrally filtrating element. All elements can be built-in individually or in combination with each other in the laser system.

Finally, the inventive laser system can also be passed through several times by the output radiation of the passively Q-switched laser. Here, the spectrally widened and temporally compressed radiation is again spectrally widened by means of the spectrally widening element by self-phase modulation and temporally compressed by the compression element. With such a multi-stage set-up, the pulses compressed in a first stage to <10 ps pulse duration can be compressed by means of a second stage to a pulse duration of <1 ps, for example.

BRIEF DESCRIPTION OF THE DRAWINGS

Practical examples of the present invention are elucidated more closely in the following by way of the relevant drawings, wherein.

Figure 1:
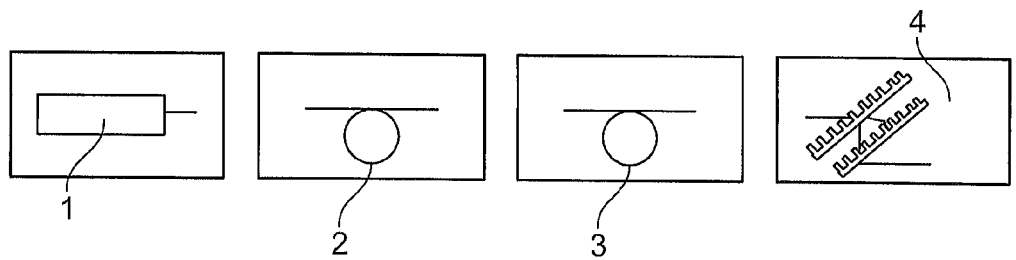
FIG. 1: is a sketch of the set-up structure of the inventive laser system.

Schematically illustrated in FIG. 1 is a laser system which is comprised of a laser 1, an amplifier 2, a spectrally widening element 3, and a compression element 4. Here, laser 1 is a microchip laser. The amplifier 2 is an optical amplifier in form of a nonlinear fiber amplifier. A single-mode fiber forms the spectrally widening element 3. The compression element 4 is a grating compressor comprised of a grating pair.

DETAILED DESCRIPTION OF THE PREFERRED EMBODIMENTS

Figure 6:
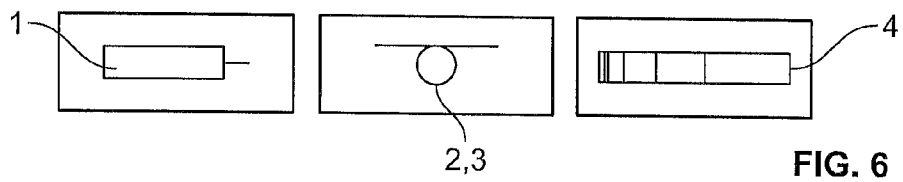
FIGS. 6/7: show further practical examples of the inventive laser systems.

In FIG. 6, the laser system is comprised of a laser 1, an amplifier 2 which at the same time is the spectrally widening element 3, and a compression element 4. Here, the spectrally widening amplifier 2, 3 may be an optical fiber which amplifies the laser pulse of laser 1 and which at the same time broadens it spectrally by self-phase modulation. The compression element 4 is a volume Bragg grating (VBG), a grating pair or a prism arrangement.

Figure 7:
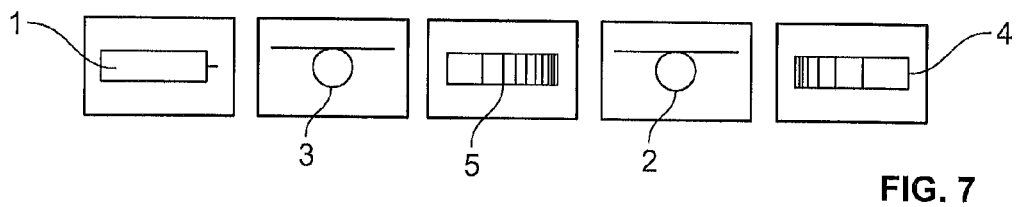

FIG. 7 shows a set-up comprised of a laser 1, a spectrally widening element 3 in form of a waveguide or an optical fiber, a temporal pulse extender 5—which may also be a VBG or a grating pair—, an amplifier 2 (e.g. a fiber with or without self-phase modulation), and a compression element 4.

The invention according to FIG. 1 in details works in a way that the passively Q-switched microchip laser 1 serves as signal source for the connecting fiber amplifier 2. The microchip laser 1 emits a mean output of 50 mW with a pulse duration of 150 ps and a pulse sequence frequency of 332 kHz. The fiber amplifier 2 is comprised of a 2.2 m long Ytterbium-endowed double-core fiber with an active core diameter of 40 µm. It increases the mean output to approx. 1 Watt. The spectrally widening element 3 is a 3 m long passive fiber with a core diameter of 10 µm. Owing to the self-phase modulation within the fiber, the spectral width of initially less than 0.02 nm is increased to 0.53 nm. A conventional grating compressor comprised of a parallel grating pair with a grating line number of 1,740 1/mm and a grating distance of 0.11 m serves as compression element 4. During the experiment, the laser system according to this practical example was able to compress the 150 ps long output pulse to an autocorrelation width of 8.8 ps. This corresponds to a pulse duration of approx. 6 ps.

Figure 2:
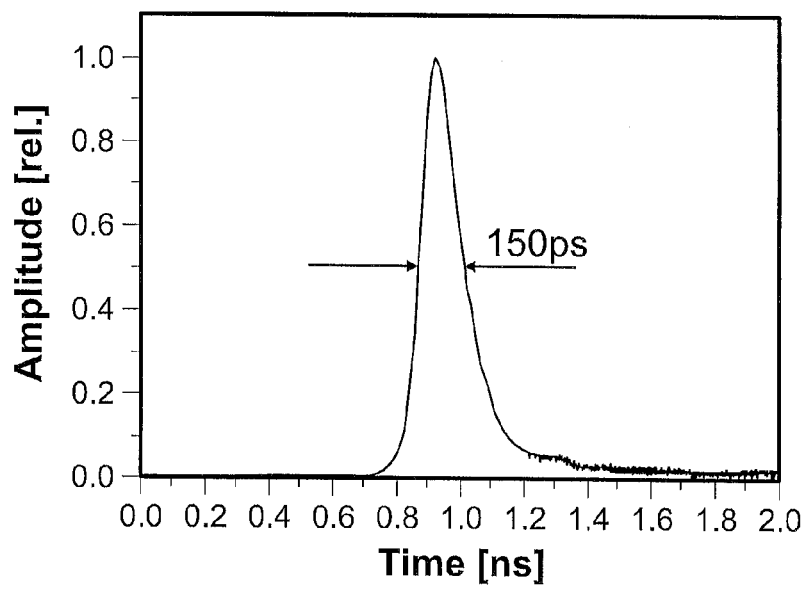
FIG. 2: shows the chronological sequence of a pulse of the microchip laser.
Figure 3:
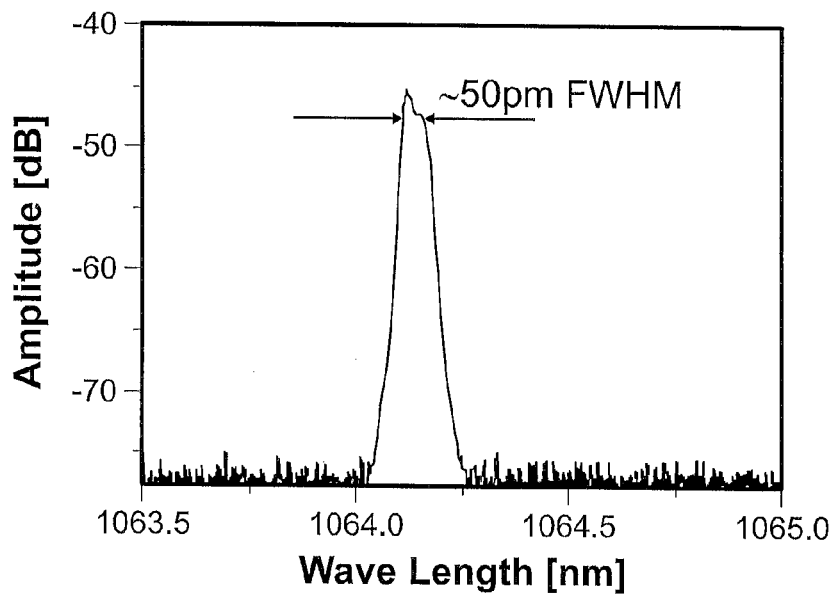
FIG. 3: shows the wavelength spectrum of the pulse of the microchip laser.
Figure 4:
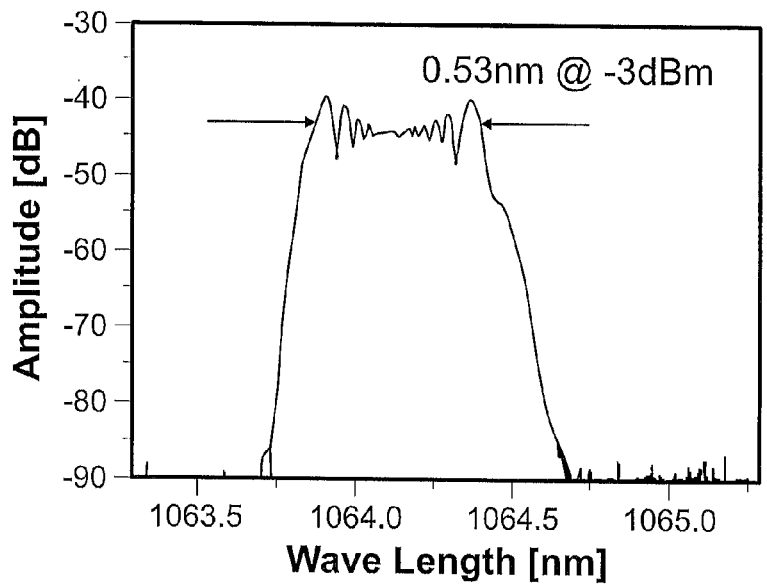
FIG. 4: shows the wavelength spectrum of the pulse after spectral widening.
Figure 5:
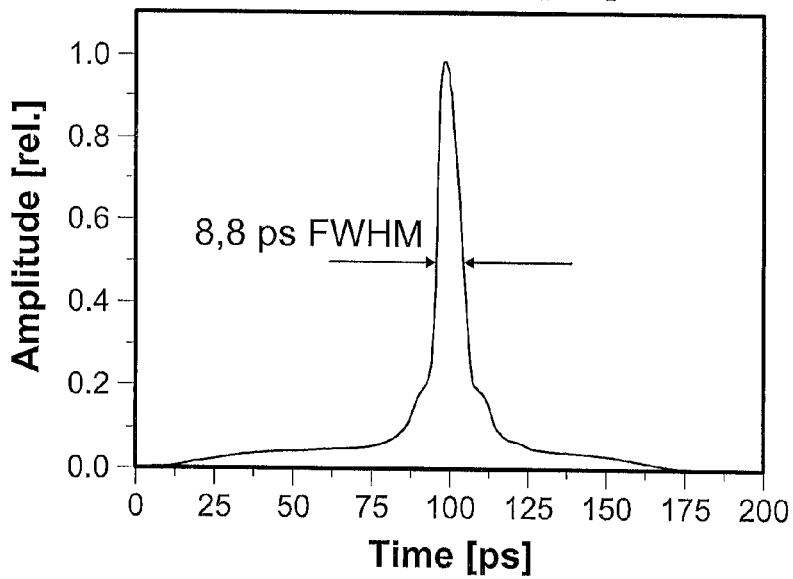
FIG. 5: shows the chronological sequence of the pulse after temporal compression.

FIG. 2 shows the 150 ps long output pulse of the microchip laser 1. Prior to widening by the spectrally widening element 3, it has a spectral half-width value of 50 pm, which is shown in FIG. 3. In FIG. 4, the emission subsequently evidences a spectral width of 0.53 nm. The autocorrelation measurement results in a pulse duration of the compressed pulse in the amount of approx. 6 ps (see FIG. 5).

The invention according to FIG. 6 works in a manner similar to that of FIG. 1. The passively Q-switched microchip laser 1 here, too, serves as signal source for the laser system. The emitted laser pulse is coupled into an optical fiber 2, 3 which amplifies it as an optical amplifier fiber on the one hand and which broadens it spectrally by self-phase modulation because of its nonlinear properties on the other hand. The laser pulse now amplified and spectrally widened subsequently hits onto a volume Bragg grating 4 where it is temporally compressed to under 10 ps pulse duration.

In the laser system according to FIG. 7, the laser pulse emitted from the Q-switched microchip laser 1 is coupled into an optical fiber 3 where it experiences a spectral widening due to self-phase modulation. Subsequently, a Bragg grating acting as pulse extender 5 provides for a temporal extension of the pulse. The temporally extended pulse is then amplified by means of amplifier fiber 2 and compressed in the fiber Bragg grating 4.

The invention claimed is:

1. Laser system with a passively Q-switched laser, a spectrally widening element comprising an optical single-mode fiber, and a compression element comprising a Bragg grating or a transmitting or a reflecting grating pair or a prism structure, wherein the passively Q-switched laser is a microchip laser comprising a neodymium-endowed vanadate crystal and a saturable semiconductor mirror, has a pulse duration of less than 200 ps and emits a single longitudinal mode which is received by the optical single-mode fiber and is spectrally widened by means of the spectrally widening element by self-phase modulation and is temporally compressed by the compression element such that a shortened pulse duration is achieved.

2. Laser system according to claim 1, wherein the passively Q-switched laser has a pulse duration of less than 50 ps.

3. Laser system according to claim 1, comprising at least one optical amplifier.

4. Laser system according to claim 3, wherein at least one optical amplifier acts as a spectrally widening element.

5. Laser system according to claim 1, comprising a pulse extender, by means of which the spectrally widened radiation is temporally extended.

6. Laser system according to claim 1, comprising an element dividing the laser pulse in terms of time.

7. Laser system according to claim 1, comprising a frequency converting element.

8. Laser system according to claim 1, comprising an element improving the pulse contrast.

9. Laser system according to claim 1, comprising a spectrally filtrating element.

10. Use of a laser system according to claim 1 for generating ultra-short laser pulses.

11. Use of a laser system according to claim 1, wherein the spectrally widened and temporally compressed radiation is spectrally widened by means of the spectrally widening element and temporally compressed by means of the compression element.

* * * * *